United States Patent
Lin et al.

(10) Patent No.: US 10,375,286 B2
(45) Date of Patent: Aug. 6, 2019

(54) IMAGING DEVICE AND IMAGING METHOD

(71) Applicant: PEGATRON CORPORATION, Taipei (TW)

(72) Inventors: Ying-Hsin Lin, Taipei (TW); Ming-Jer Yang, Taipei (TW); Kui-Hao Chang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/927,951

(22) Filed: Mar. 21, 2018

(65) Prior Publication Data

US 2018/0316836 A1 Nov. 1, 2018

(30) Foreign Application Priority Data

Apr. 26, 2017 (TW) .............................. 106113863 A (51) Int. Cl.
*H04N 5/262* (2006.01)
*H04N 5/232* (2006.01)
(Continued)

(52) U.S. Cl.
CPC ........... *H04N 5/2258* (2013.01); *G02B 27/18* (2013.01); *G03B 13/32* (2013.01); *G06K 9/78* (2013.01);
(Continued)

(58) Field of Classification Search
CPC ........... H04N 5/2258; H04N 5/232123; H04N 5/2351; H04N 13/00; H04N 5/232122; H04N 5/23245; H04N 5/23229; H04N 5/262; H04N 9/04; G06K 9/78; G02B 27/18; G02B 7/36; G02B 7/34; G02B 27/646; G02B 27/10; G06T 5/50; G06T 1/20; G03B 13/32

See application file for complete search history.

(56) References Cited

U.S. PATENT DOCUMENTS 10,067,058 B1 * 9/2018 Brown .................... G01J 3/00
2012/0069181 A1 * 3/2012 Xue ..................... G01J 3/0229
348/148

(Continued)

FOREIGN PATENT DOCUMENTS

CN 102016679 4/2011
CN 102253581 12/2012
(Continued)

*Primary Examiner* — Hung H Lam
(74) *Attorney, Agent, or Firm* — J.C. Patents (57) ABSTRACT

An imaging device and an imaging method are provided. An incident beam is separated into a first spectroscopic beam and a second spectroscopic beam by a spectroscopic unit and the first spectroscopic beam and the second spectroscopic beam are respectively incident on a first imaging module and a second imaging module. One of a phase detection autofocus (PDAF) mode and a contrast detection autofocus (CDAF) mode of the first imaging module is activated based on a brightness of an ambient light source. The first imaging module and the second imaging module are activated to shoot at a partially overlapping field of view (FOV) to obtain a first image and a second image. The first image and the second image are superimposed to obtain a composite image.

10 Claims, 4 Drawing Sheets (51) Int. Cl.
*H04N 5/225* (2006.01)
*G03B 13/32* (2006.01)
*G06K 9/78* (2006.01)
*G06T 1/20* (2006.01)
*H04N 9/04* (2006.01)
*G06T 5/50* (2006.01)
*G02B 27/18* (2006.01)
*H04N 5/235* (2006.01)
*H04N 13/00* (2018.01)
*G02B 27/10* (2006.01)
*G02B 7/34* (2006.01)
*G02B 7/36* (2006.01)
*G02B 27/64* (2006.01)

(52) U.S. Cl.
CPC ............ *G06T 1/20* (2013.01); *G06T 5/50* (2013.01); *H04N 5/2351* (2013.01); *H04N 5/23229* (2013.01); *H04N 5/23245* (2013.01); *H04N 5/232122* (2018.08); *H04N 5/232123* (2018.08); *H04N 5/262* (2013.01); *H04N 9/04* (2013.01); *H04N 13/00* (2013.01); *G02B 7/34* (2013.01); *G02B 7/36* (2013.01); *G02B 27/10* (2013.01); *G02B 27/646* (2013.01)

(56) References Cited

U.S. PATENT DOCUMENTS

| | | | |
|---|---|---|---|
| 2015/0369693 | A1* | 12/2015 | Morris ............ G01M 3/38 356/437 |
| 2017/0219487 | A1* | 8/2017 | Hill ............ G02B 27/10 |
| 2018/0309941 | A1* | 10/2018 | Lopez ............ G01N 21/3504 |

FOREIGN PATENT DOCUMENTS

| | | |
|---|---|---|
| TW | 201336300 | 9/2013 |
| TW | 201410201 | 3/2014 |
| TW | 201616168 | 5/2016 |
| TW | I537667 | 6/2016 |
| TW | 201626792 | 7/2016 |
| TW | 201631466 | 9/2016 |

* cited by examiner

IMAGING DEVICE AND IMAGING METHOD

CROSS-REFERENCE TO RELATED APPLICATION

This application claims the priority benefit of Taiwan application serial no. 106113863, filed on Apr. 26, 2017. The entirety of the above-mentioned patent application is hereby incorporated by reference herein and made a part of this specification.

BACKGROUND

Field of Invention

The invention is directed to an imaging device and an imaging method, and more particularly, to an imaging device and an imaging method having two imaging modules.

Related Art

Following the increase of portable electronic device users and the development of display technology, portable electronic devices not only have a call function, but also combine a variety of multimedia features, such as camera function, animation display function and gaming function. Among the variety of multimedia features of the portable electronic devices, the camera function is the most popular.

Due to structural limitations, if a portable electronic device with the camera function (e.g., a camera, smartphone or a tablet PC) intends to provide an image quality close to an image quality of a monocular camera, then it generally is coordinated with a dual-lens system to achieve an optical zooming effect. However, because it is a dual-lens system design, the portable electronic device has two lens holes on its appearance. The two lens holes are respectively for enabling two lens systems to receive a plurality of beams from an ambient light source, but cause the appearance of the portable electronic device to become less attractive. Moreover, such portable electronic device is unable to improve focus accuracy when shooting at dark places.

SUMMARY

The invention provides an imaging device and an imaging method, which enable the appearance of a portable electronic device to have only one lens hole, and can automatically switch between focus modes to enhance focus accuracy.

The imaging device of the invention includes: a spectroscopic unit, a first imaging module, a second imaging module, and a processor. The spectroscopic unit receives an incident beam and splits the incident beam into a first spectroscopic beam and a second spectroscopic beam. The first imaging module receives the first spectroscopic beam to form the first image. The first imaging module switches between a phase detection autofocus (PDAF) mode and a contrast detection autofocus (CDAF) mode based on a brightness of an ambient light source. The second imaging module receives the second spectroscopic beam to form the second image. The processor is coupled to the first imaging module and the second imaging module respectively, and controls the first imaging module and the second imaging module to shoot with partially overlapping field of views to obtain the first image and the second image captured with the partially overlapping field of views from the first imaging module and the second imaging module, wherein the first image and the second image are superimposed by the processor to obtain a composite image.

In one embodiment of the invention, the processor includes an image signal processor, and the image signal processor determines whether the brightness of the ambient light source is smaller than a preset value. When the brightness of the ambient light source is determined to be smaller than the preset value, the processor drives the first imaging module to switch to the contrast detection autofocus mode. When the brightness of the ambient light source is determined to be not smaller than the preset value, the processor drives the first imaging module to switch to the phase detection autofocus mode.

In one embodiment of the invention, the first imaging module includes a first lens module and a first focus sensor. The first lens module receives the first spectroscopic beam. The first focus sensor is coupled to the processor, and the first focus sensor has the phase detection autofocus mode and the contrast detection autofocus mode, and receives a first beam emitted from the first lens module to form the first image by the first focus sensor. The second imaging module includes a second lens module and a second focus sensor. The second lens module receives the second spectroscopic beam. The second focus sensor receives a second beam emitted from the second lens module to form the second image by the second focus sensor. Herein, the field of view of the second lens module is smaller than the field of view of the first lens module.

In one embodiment of the invention, the first imaging module further includes: a first driving circuit coupled to the processor; and a first actuator coupled to the first driving circuit and the first lens module. The processor controls the first actuator through the first driving circuit to adjust a position of the first lens module. The second imaging module further includes: a second driving circuit coupled to the processor; and a second actuator coupled to the second driving circuit and the second lens module. The processor controls the second actuator through the second driving circuit to adjust a position of the second lens module.

In one embodiment of the invention, the first imaging module further includes an image signal processor. The image signal processor is coupled to the first focus sensor and determines whether a brightness of the first beam that enters into the first focus sensor as the ambient light source is smaller than a preset value. When the brightness of the first beam entering into the first focus sensor is determined to be the smaller than the preset value, the image signal processor drives the first focus sensor to switch to the contrast detection autofocus mode. When the brightness of the first beam entering into the first focus sensor is determined to be not smaller than the preset value, the image signal processor drives the first focus sensor to switch to the phase detection autofocus mode.

In one embodiment of the invention, the first actuator is a voice coil motor (VCM).

In one embodiment of the invention, the first lens module includes a wide-angle lens, and the second lens module includes a telephoto lens.

In one embodiment of the invention, the imaging device further includes an incident unit, gathering a plurality of beams from the ambient light source to output the incident beam.

The imaging method of the invention includes: using a spectroscopic unit to split an incident beam into a first spectroscopic beam and a second spectroscopic beam, wherein the first spectroscopic beam and the second spectroscopic beam are respectively incident into a first imaging module and a second imaging module; activating one of a phase detection autofocus mode and a contrast detection autofocus mode of the first imaging module based on a brightness of an ambient light source; driving the first imaging module and the second imaging module to shoot with partially overlapping field of views to obtain a first image and a second image captured with the partially overlapping field of views; and superimposing the first image and the second image to obtain a composite image.

In one embodiment of the invention, steps of activating one of the phase detection autofocus mode and the contrast detection autofocus mode of the first imaging module based on the brightness of the ambient light source include: driving the first imaging module to switch to the contrast detection autofocus mode when the brightness of the ambient light source is determined to be smaller than a preset value; and driving the first imaging module to switch to the phase detection autofocus mode when the brightness of the ambient light source is determined to be not smaller than the preset value.

In view of the above, the portable electronic device can use dual imaging module to achieve an optical zooming effect with only one lens hole at its appearance, and can automatically switching between the autofocus modes based on the brightness of the ambient light source, and thus the focus accuracy can be enhanced even when the ambient light source is dimmed.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF THE EMBODIMENT

Figure 1:
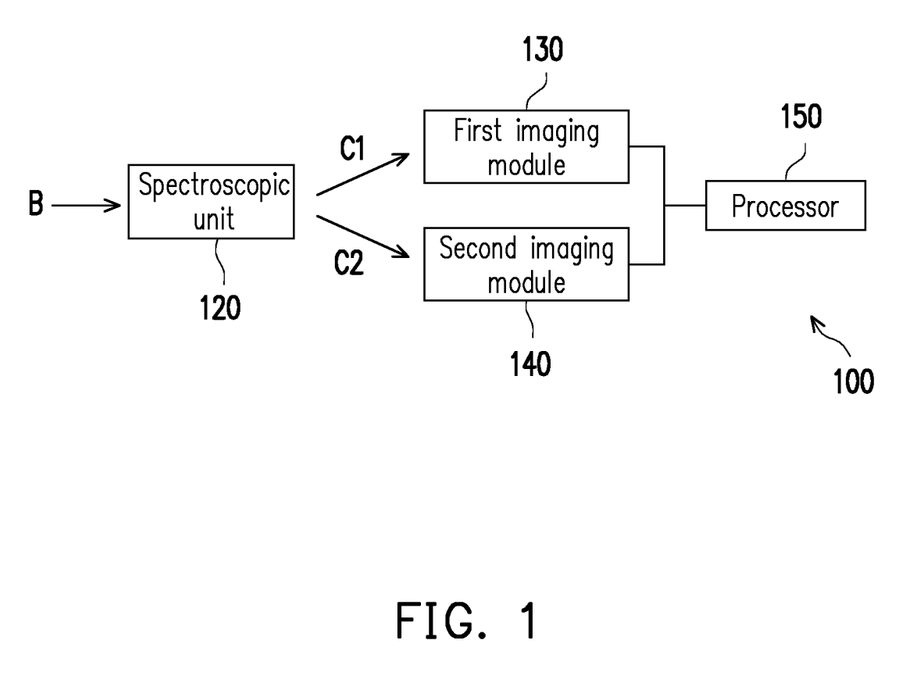
FIG. 1 is a block diagram of an imaging device according to an embodiment of the invention.

FIG. 1 is a block diagram of an imaging device according to an embodiment of the invention. Referring to FIG. 1, the imaging device 100 can be disposed at a portable electronic device or any electronic device that requires to be equipped with image capturing function. The imaging device 100 includes a spectroscopic unit 120, a first imaging module 130, a second imaging module 140, and a processor 150.

The spectroscopic unit 120 is configured to receive an incident beam B and split the incident beam B into a first spectroscopic beam C1 and a second spectroscopic beam C2. The first imaging module 130 receives the first spectroscopic beam C1 to form a first image. The second imaging module 140 receives the second spectroscopic beam C2 to form a second image.

The processor 150 is coupled to the first imaging module 130 and the second imaging module 140 respectively, and controls the first imaging module 130 and the second imaging module 140 to shoot with partially overlapping field of views to obtain the first image and the second image captured with the partially overlapping field of views from the first imaging module 130 and the second imaging module 140. Then, the first image and the second image are superimposed by the processor 150 to obtain a composite image, wherein the first imaging module 130 and the second imaging module 140 can perform shooting at the same time, or the first imaging module 130 and the second imaging module 140 can perform shooting with an interval of time apart, but the invention is not limited thereto.

The processor 150 is, for example, a central processing unit (CPU), a graphic processing unit (GPU), a physics processing unit (PPU), a programmable microprocessor, an embedded control chip, a digital signal processor (DSP), application specific integrated circuits (ASIC), or the like. The processor 150 controls the first imaging module 130 and the second imaging module 140 to perform shooting, so as to obtain the first image and the second image from the first imaging module 130 and the second imaging module 140.

The first imaging module 130 and the second imaging module 140 are independent imaging modules, and a dual-lens optical zooming effect can be achieved with the first imaging module 130 and the second imaging module 140. For instance, the first imaging module 130 is a wide-angle system, and the second imaging module 140 is a telephoto system. Details regarding the structure of the imaging device 100 are provided in the following with examples.

Figure 2:
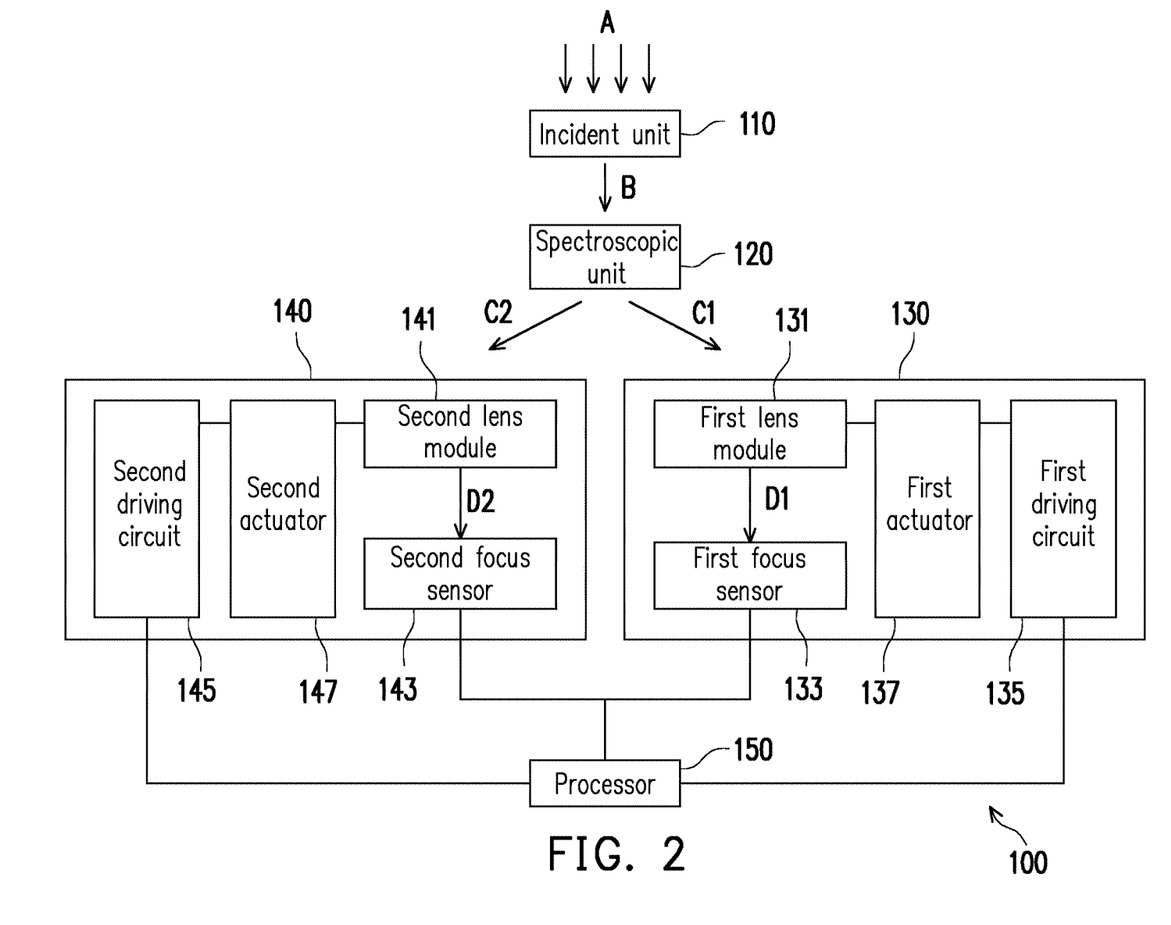
FIG. 2 is a schematic structural diagram of an imaging device according to an embodiment of the invention.

FIG. 2 is a schematic structural diagram of an imaging device according to an embodiment of the invention. Referring to FIG. 2, the imaging device 100 further includes an incident unit 110. The incident unit 110 is a lens which can gather or collect in-coming beams. The incident unit 110 is configured to gather a plurality of beams A from the ambient light source so as to output an incident beam B, and incidents the incident beam B into the spectroscopic unit 120.

The spectroscopic unit 120 is, for example, a beam splitter or other spectroscopic device with beam splitting function.

The first imaging module 130 includes a first lens module 131, a first focus sensor 133, a first driving circuit 135, and a first actuator 137. The processor 150 is coupled to the first driving circuit 135 and the first focus sensor 133 respectively, and the processor 150 drives the first driving circuit 135 and the first focus sensor 133 to perform operations. The first focus sensor 133 is, for example, a fast hybrid autofocus sensor. Herein, the fast hybrid autofocus sensor is a combination of a phase detection autofocus (PDAF) sensor and a contrast detection autofocus (CDAF) sensor. Hence, the first focus sensor 133 is able to provide two autofocus modes, namely, a contrast detection autofocus mode and a phase detection autofocus mode. The first imaging module 130 combines the two autofocus modes in order to selectively switch between the two autofocus modes when tracking a fast-moving shooting target, so as to enhance accuracy and provide fast response.

The phase detection autofocus mode is based on projecting lights that enter the lens onto the phase detection autofocus sensor and using the phase detection autofocus sensor to compare lights at two radial directions of the lens. The contrast detection autofocus mode mainly detects a position of highest contrast during an adjustment of a contrast information of a focus subject in an image, that is, by increasing a brightness contrast of a focus area, searching for a region with the highest brightness contrast, and locking the focus at the position of the region.

In the first imaging module 130, the processor 150, through the first driving circuit 135, controls the first actuator 137 responsible for adjusting a position of the first lens module 131, so as to adjust a focal length or a magnification. The first actuator 137 is, for example, a voice coil motor (VCM), and may also enable the lens to autofocus and provide image stabilization.

The second imaging module 140 includes a second lens module 141, a second focus sensor 143, a second driving circuit 145, and a second actuator 147. The processor 150 is coupled to the second driving circuit 145 and the second focus sensor 143 respectively, and the processor 150 drives the second driving circuit 145 and the second focus sensor 143 to perform operations. In the second imaging module 130, the processor 150, through the second driving circuit 145, controls the second actuator 147 responsible for adjusting a position of the second lens module 141, so as to adjust a focal length or a magnification. The second focus sensor 143 is, for example, a contrast autofocus sensor. The second actuator 147 is, for example, a voice coil motor.

The first lens module 131 includes a wide-angle lens, and the second lens module 141 includes a telephoto lens. A field of view (FOV) of the second lens module 141 is smaller than a FOV of the first lens module 131. For instance, the FOV of the second lens module 141 is 30° to 50°, and the FOV of the first lens module 131 is greater than 75°. However, this is only an example, and the invention is not limited thereto.

The plurality of beams A enters into the incident unit 110 and is output as the incident beam B, and the incident beam B enters into the spectroscopic unit 120 and is split into the first spectroscopic beam C1 and the second spectroscopic beam C2 by the spectroscopic unit 120. The first spectroscopic beam C1 enters into the first lens module 131, and passes through the first lens module 131 to be emitted to the first focus sensor 133 as the first beam D1. The first focus sensor 133 can completely receive the first beam D1, thereby forming the first image at the first focus sensor 133.

At the same time, the second spectroscopic beam C2 split by the spectroscopic unit 120 enters into the second lens module 141, and passes through the second lens module 141 to be emitted to the second focus sensor 143 as the second beam D2. The second focus sensor 143 can completely receive the second beam D2, thereby forming the second image at the second focus sensor 143.

Herein, the first imaging module 130 determines to activate the contrast detection autofocus mode or the phase detection autofocus mode of the first focus sensor 133 based on the brightness of the ambient light source. In one embodiment, for example, the processor 150 includes an image signal processor (ISP), the image signal processor of the processor 150 determines whether the brightness of the ambient light source is smaller than a preset value, and the processor 150 can obtain the brightness of the ambient light source by any means, the invention is not limited thereto. When the brightness of the ambient light source is determined to be smaller than the preset value, the processor 150 drives the first focus sensor 133 to switch to the contrast detection autofocus mode. When the brightness of the ambient light source is determined to be not smaller than the preset value, the processor 150 drives the first focus sensor 133 to switch to the phase detection autofocus mode.

Figure 3:
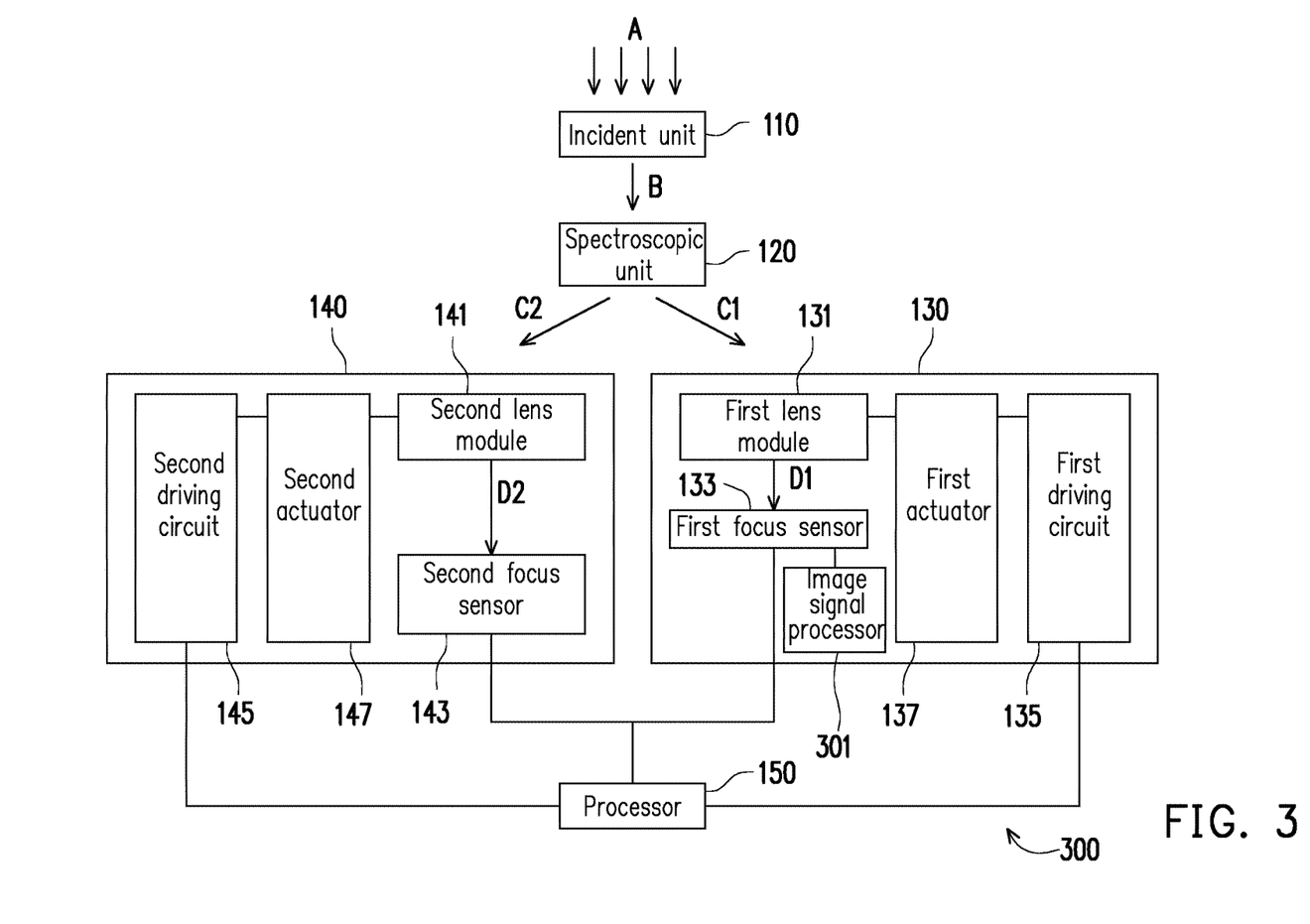
FIG. 3 is a schematic structural diagram of an imaging device according to another embodiment of the invention.

FIG. 3 is a schematic structural diagram of an imaging device according to another embodiment of the invention. In the present embodiment, components having the same function as the ones in the imaging device 100 are marked with the same references numerals, and detail descriptions thereof are omitted. A difference between the imaging device 300 of FIG. 3 and the imaging device 100 lies in that: the image signal processor 301 is disposed at the first imaging module 130 of the imaging device 300, namely, the first imaging module 130 further includes an image signal processor 301, wherein the image signal processor 301 is coupled to the first focus sensor 133.

In the present embodiment, for instance, a brightness of the first beam D1 which is emitted via the first lens module 131 from the first spectroscopic beam C1 serves as the brightness of the ambient light source, and the image signal processor 301 coupled to the first focus sensor 133 is being used to determine whether the brightness of the first beam D1 is smaller than the preset value.

When the brightness of the first beam D1 is determined to be smaller than the preset value, the image signal processor 301 drives the first focus sensor 133 to switch to the contrast detection autofocus mode. When the brightness of the first beam D1 is determined to be not smaller than the preset value, the image signal processor 301 drives the first focus sensor 133 to switch to the phase detection autofocus mode.

Moreover, in other embodiment, the image signal processor 301 may also be disposed within the second imaging module 140, and a brightness of the second beam D2 which is emitted via the second lens module 141 from the second spectroscopic beam C2 may serve as the brightness of the ambient light source. When the brightness of the second beam D2 is determined to be smaller than the preset value, the image signal processor 301 informs the processor 150, and the processor 150 drives the first focus sensor 133 to switch to the contrast detection autofocus mode. When the brightness of the second beam D2 is determined to be not smaller than the preset value, the image signal processor 301 informs the processor 150, and the processor 150 drives the first focus sensor 133 to switch to the phase detection autofocus mode.

In the following, an imaging method is described using the imaging device 100.

Figure 4:
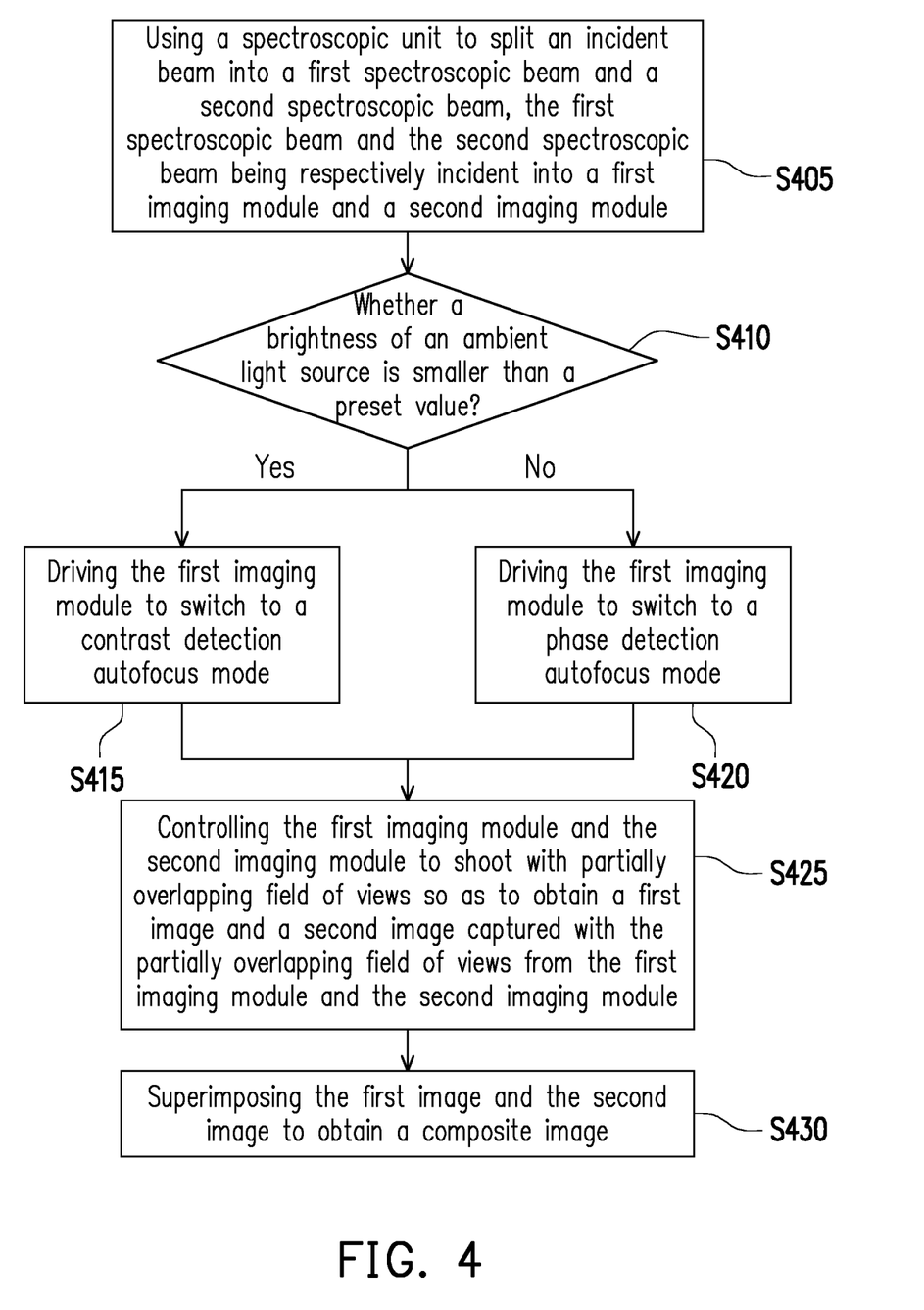
FIG. 4 is a flow chart of an imaging method according to an embodiment of the invention.

FIG. 4 is a flow chart of an imaging method according to an embodiment of the invention. Referring to FIG. 2 and FIG. 4 at the same time, in step S405, the spectroscopic unit 120 is being used to split the incident beam B into the first spectroscopic beam C1 and the second spectroscopic beam C2, and the first spectroscopic beam C1 and the second spectroscopic beam C2 are respectively incident to the first imaging module 130 and the second imaging module 140.

Next, in step S410, the brightness of the ambient light source is being determined on whether it is smaller than a preset value, and based on the brightness of the ambient light source, one of the phase detection autofocus mode and the contrast detection autofocus mode of the first focus sensor 133 of the first imaging module 130 is being activated. Herein, the preset value is, for example, 300 lux. However, 300 lux is only provided as an example, the invention is not limited thereto.

When the step S410 is corresponded to the embodiment in which the image signal processor 301 is disposed within the processor 150, the image signal processor 301 is being used to determine whether the brightness of the ambient light source is smaller than the preset value, and then drives the first focus sensor 133 to accordingly activate one of the phase detection autofocus mode and the contrast detection autofocus mode of the first focus sensor 133.

When the step S410 is corresponded to the embodiment of FIG. 3, the brightness of the first beam D1 serves as the brightness of the ambient light source, and the image signal processor 301 coupled to the first focus sensor 133 is being used to determine whether the brightness of the first beam D1 is smaller than the preset value, so as to accordingly activate one of the phase detection autofocus mode and the contrast detection autofocus mode of the first focus sensor 133.

When the step S410 is corresponded to the embodiment in which the image signal processor 301 disposed within the second imaging module 140, the brightness of the second beam D2 serves the brightness of the ambient light source, and the image signal processor 301 disposed within the second focus sensor 143 is being used to determine whether the brightness of the second beam D2 is smaller than the preset value, thereby enabling the processor 150 to drive the first focus sensor 133 to accordingly activate one of the phase detection autofocus mode and the contrast detection autofocus mode of the first focus sensor 133.

When the brightness of the ambient light source is determined to be smaller than the preset value, in step S415, the first imaging module 130 is being driven to switch to the contrast detection autofocus mode. When the brightness of the ambient light source is determined to be not smaller than the preset value, in step S420, the first imaging module 130 is being driven to switch to the phase detection autofocus mode.

After determined the autofocus mode of the first focus sensor 133, in step S425, the processor 150 controls the first imaging module 130 and the second imaging module 140 to shoot with partially overlapping field of views so as to obtain the first image and the second image captured with the partially overlapping field of views from the first imaging module 130 and the second imaging module 140.

Specifically, the processor 150 receives a first focus signal and a second focus signal respectively from the first focus sensor 133 and the second focus sensor 143. Afterwards, the processor 150 correspondingly generates a first control signal and a second control signal respectively, and transmits the first control signal and the second control signal to the first driving circuit 135 and the second driving circuit 145 respectively.

The first driving circuit 135, after receiving the first control signal corresponded thereto, drives the first actuator 137 to adjust a position of the first lens module 131, so as to change a focus distance of the first focus sensor 133. The second driving circuit 145, after receiving the second control signal corresponded thereto, drives the second actuator 147 to adjust a position of the second lens module 141, so as to change a focus distance of the second focus sensor 143. Afterwards, the processor 150 controls the first focus sensor 133 and the second focus sensor 143 to shoot with partially overlapping field of views, so as to obtain the first image and the second image captured with the partially overlapping field of views from the first imaging module 130 and the second imaging module 140.

Herein, the first focus sensor 133 and the second focus sensor 143 may use a same focus signal to perform focusing, and may also use different focus signals to perform focusing.

After obtained the first image and the second image, in step S430, the processor 150 superimpose the first image and the second image to obtain a composite image. The processor 150 executes an image processing algorithm to superimpose the first image and the second image. For instance, an image stitching algorithm may be used to superimpose multiple images.

The image stitching algorithm mainly includes two parts: image matching and image blending. Firstly, identical feature points between the first image and the second image are being matched, such as, by firstly finding out overlapping parts, and then stitching the overlapping parts. Afterwards, color blending and correction are performed to the stitched parts, so that the first image and the second image can be superimposed together without producing color discontinuities.

For example, in the first image produced by the first imaging module 130, an area to be synthesized is box selected to perform a background and graphics grayscale binary conversion, so as to find out the feature points in the synthesized area and to set a threshold to carry out a replacement comparison. In addition, a grayscale binary conversion is performed to the second image produced by the second imaging module 140. Next, after performing a horizontal and vertical vector difference calculation on the first image and the second image, a stitch mating for interpolation points is performed, the background areas are left intact, and after a graphic replacement is performed on the synthesized area, a color reproduction is performed. Thus, the first image and the second image being captured can be superimposed, to achieve an optical zooming effect.

In summary, the invention combines the first imaging module of the wide-angle system and the second imaging module of the telephoto system in one imaging device, only requires to be designed with one lens hole in the appearance for receiving the plurality of beams A from the ambient light source and uses the spectroscopic unit to split the incident beam into two beams, and thus is capable of achieving the dual-lens optical zooming effect. Moreover, the first imaging module can automatically switch between the contrast detection autofocus mode and the phase detection autofocus mode based on the brightness of the ambient light source, and thus the focus accuracy can still be enhanced even when the ambient light source is dimmed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. An imaging device, comprising:
   a spectroscopic unit, receiving an incident beam and splitting the incident beam into a first spectroscopic beam and a second spectroscopic beam;
   a first imaging module, receiving the first spectroscopic beam to form a first image, and switching between a phase detection autofocus mode and a contrast detection autofocus mode based on a brightness of an ambient light source;
   a second imaging module, receiving the second spectroscopic beam to form a second image; and
   a processor, coupled to the first imaging module and the second imaging module respectively, and controlling the first imaging module and the second imaging module to shoot with partially overlapping field of views to obtain the first image and the second image captured with the partially overlapping field of views from the first imaging module and the second imaging module, wherein the first image and the second image are superimposed by the processor to obtain a composite image.
2. The imaging device as recited in claim 1, wherein the processor comprises an image signal processor, and the image signal processor determines whether the brightness of the ambient light source is smaller than a preset value;
   when the brightness of the ambient light source is determined to be smaller than the preset value, the processor drives the first imaging module to switch to the contrast detection autofocus mode; and
   when the brightness of the ambient light source is determined to be not smaller than the preset value, the processor drives the first imaging module to switch to the phase detection autofocus mode.

3. The imaging device as recited in claim 1, wherein
the first imaging module comprises:
a first lens module, receiving the first spectroscopic beam; and
a first focus sensor, coupled to the processor, having the phase detection autofocus mode and the contrast detection autofocus mode, and receiving a first beam emitted from the first lens module to form the first image by the first focus sensor;
the second imaging module comprises:
a second lens module, receiving the second spectroscopic beam; and
a second focus sensor, coupled to the processor, and receiving a second beam emitted from the second lens module to form the second image by the second focus sensor; and
wherein, the field of view of the second lens module is smaller than the field of view of the first lens module.

4. The imaging device as recited in claim 3, wherein
the first imaging module further comprises:
a first driving circuit, coupled to the processor; and
a first actuator, coupled to the first driving circuit and the first lens module, wherein the processor controls the first actuator through the first driving circuit to adjust a position of the first lens module; and
the second imaging module further comprises:
a second driving circuit, coupled to the processor; and
a second actuator, coupled to the second driving circuit and the second lens module, wherein the processor controls the second actuator through the second driving circuit to adjust a position of the second lens module.

5. The imaging device as recited in claim 3, wherein the first imaging module further comprises:
an image signal processor, coupled to the first focus sensor, and determining whether a brightness of the first beam that enters into the first focus sensor as the ambient light source is smaller than a preset value;
wherein, when the brightness of the first beam entering into the first focus sensor is determined to be the smaller than the preset value, the image signal processor drives the first focus sensor to switch to the contrast detection autofocus mode; and
when the brightness of the first beam entering into the first focus sensor is determined to be not smaller than the preset value, the image signal processor drives the first focus sensor to switch to the phase detection autofocus mode.

6. The imaging device as recited in claim 4, wherein the first actuator is a voice coil motor.

7. The imaging device as recited in claim 3, wherein the first lens module comprises a wide-angle lens, and the second lens module comprise a telephoto lens.

8. The imaging device as recited in claim 1, further comprising:
an incident unit, gathering a plurality of beams from the ambient light source to output the incident beam.

9. An imaging method, comprising:
using a spectroscopic unit to split an incident beam into a first spectroscopic beam and a second spectroscopic beam, wherein the first spectroscopic beam and the second spectroscopic beam are respectively incident into a first imaging module and a second imaging module;
activating one of a phase detection autofocus mode and a contrast detection autofocus mode of the first imaging module based on a brightness of an ambient light source;
driving the first imaging module and the second imaging module to shoot with partially overlapping field of views to obtain a first image and a second image captured with the partially overlapping field of views; and
superimposing the first image and the second image to obtain a composite image.

10. The imaging method as recited in claim 9, wherein steps of activating one of the phase detection autofocus mode and the contrast detection autofocus mode of the first imaging module based on the brightness of the ambient light source comprise:
driving the first imaging module to switch to the contrast detection autofocus mode when the brightness of the ambient light source is determined to be smaller than a preset value; and
driving the first imaging module to switch to the phase detection autofocus mode when the brightness of the ambient light source is determined to be not smaller than the preset value.

* * * * *